United States Patent

[11] 3,620,699

[72] Inventors Blake Reynolds
Riverside;
Clifford G. Ludeman, Darien, both of Conn.
[21] Appl. No. 879,960
[22] Filed Dec. 3, 1969
[45] Patented Nov. 16, 1971
[73] Assignee Texaco Development Corporation
New York, N.Y.
Original application Sept. 19, 1967, Ser. No. 668,962. Divided and this application Dec. 3, 1969, Ser. No. 879,960

[54] REDUCING GAS GENERATION
6 Claims, No Drawings

[52] U.S. Cl. .................................................. 48/212,
48/213, 48/215, 252/373, 252/376
[51] Int. Cl. ........................................................ C01b 2/14
[50] Field of Search ........................................... 48/212,
213, 215, 197 US, 196 US; 252/373, 374, 376;
23/212, 212 A

[56] References Cited
UNITED STATES PATENTS

| | | | |
|---|---|---|---|
| 2,740,706 | 4/1956 | Paull et al. ...................... | 75/35 |
| 2,837,419 | 6/1958 | Sellers et al. .................... | 75/35 X |
| 2,941,877 | 6/1960 | Grahame ......................... | 48/215 X |
| 3,148,050 | 9/1964 | von Bogdandy .................. | 75/34 |
| 3,168,386 | 2/1965 | Moritz et al. .................... | 48/212 |
| 3,189,438 | 6/1965 | von Bogdandy .................. | 75/35 X |
| 3,375,098 | 3/1968 | Marshall ........................... | 48/213 X |
| 3,475,160 | 10/1969 | Heinzelmann et al. .......... | 48/213 X |

OTHER REFERENCES

" The Making, Shaping, and Treating of Steel," pg. 254, U.S. Steel Corp., 7 th Ed.. (1957).

*Primary Examiner*—Joseph Scovronek
*Attorneys*—K. E. Kavanagh and Thomas H. Whaley ABSTRACT: Process for the production of an improved reducing gas comprising essentially $H_2+CO$ and having a minimum "reducing ratio" $(H_2+CO)/(H_2O+CO_2)$ of 15. The reducing gas is generated in a separate unpacked noncatalytic reaction zone by the partial oxidation of a liquid hydrocarbonaceous fuel, substantially in the absence of supplemental $H_2O$. The temperature in the reaction zone is moderated by a gas mixture having a "reducing ratio" greater than about 1, for example: a portion of cooled reducing gas from the reaction zone; or a portion of the off-gas from an integrated process zone such as an ore reduction zone; or a mixture of both of these gases. In addition to the metallurgical applications, the gas mixtures, as produced by the process of this invention, may be used directly as a fuel gas or as feedstock in processes for the synthesis of methanol, hydrocarbons, or oxygenated organic chemicals.

REDUCING GAS GENERATION

This is a division of application Ser. No. 668,962, filed Sept. 19, 1967.

BACKGROUND OF THE INVENTION

1. Field of the Invention

This invention relates to a process for the production of an improved reducing gas by the partial oxidation of a liquid hydrocarbon in the absence of supplemental $H_2O$, for direct use in reducing metallic oxides, chemical synthesis, or as a fuel gas. In one of its more specific aspects, this invention relates to a continuous process for producing an improved reducing gas by the partial oxidation of a liquid hydrocarbonaceous fuel substantially in the absence of supplemental $H_2O$ but in the presence of a gas mixture which moderates the temperature in the reaction zone. The gas moderator may comprise a portion of product-reducing gas, or a portion of the off-gas from an integrated process zone, for example, an ore reduction zone to which at least a portion of said product-reducing gas is supplied to effect the reduction of metallic oxides to elemental metal.

2. Description of the Prior Art

In current processes for the manufacture of synthesis gas, a hydrocarbon is reacted with an oxidizing gas and steam at a temperature high enough to generate a gaseous effluent stream of raw synthesis gas comprising principally CO and $H_2$, together with minor amounts of $H_2O$, $CO_2$, $CH_4$, $H_2S$, and free carbon. Furthermore, when the oxidizing gas is air, the product gas is diluted with about 50 mole percent of nitrogen. The $H_2O$ and $CO_2$ content in conventional raw synthesis gas will generally lower the reducing capacity of the gas to a point where it is inefficient for reducing metallic oxides to elemental metal. Furthermore, because of carbon monoxide or hydrogen deficiencies in the product gas stream, supplemental additions of one or both of these gases may be made or expensive purification and enrichment steps taken in current processes to convert raw synthesis gas to a usable reducing gas.

In a conventional blast furnace, iron ore is mainly reduced by the carbon monoxide produced within the blast furnace from coke and air. Although hydrogen is a desirable reductant for iron oxide, the reducing gas in a conventional blast furnace contains less than 2 percent hydrogen. Hydrogen will penetrate iron ore more readily than carbon or carbon monoxide; and, it will usually reduce the ore to a greater degree and at a lower temperature. However, hydrogen alone is not satisfactory. For example, at a temperature of 1,832° F. and up to 75 percent reduction, the reduction rate with hydrogen is faster than with carbon monoxide; but, then hydrogen loses efficiency rapidly. Furthermore, reduction of iron oxides with hydrogen is an endothermic reaction and requires auxiliary heat; whereas reduction with carbon monoxide is exothermic, liberating heat. Since the reducing gas produced by the process of this invention comprises both hydrogen and carbon monoxide, it is more effective than carbon monoxide alone and it costs less than hydrogen.

The quality of a reducing gas for direct ore reduction can be characterized by the so-called "reducing ratio" $(H_2+CO)/H_2O+CO_2)$. A reducing gas should have the highest possible reducing ratio in order to give it maximum efficiency for the reaction with metallic oxides.

For a more complete description of the synthesis gas process, refer to U.S. Pat. No. 2,809,104, issued to Dale M. Strasser et al.

SUMMARY OF THE INVENTION

By the process of this invention a hydrocarbonaceous liquid, such as fuel oil, and an oxidizing gas such as substantially pure oxygen, are reacted in the absence of supplemental steam. The atomic ratio of elemental oxygen in the oxidant to carbon atoms in the fuel is held at about 1 to 1.2. Controlled combustion takes place in the reaction zone at a temperature above 2,000° F., preferably in the range of 2,000° F. to 3,500° F. and a pressure in the range of atmospheric to 3,500 p.s.i.g., and preferably about 2 to 50 atmospheres. A gas mixture having a reducing ratio of about 1 or more is introduced into the combustion zone to moderate the reaction temperature. The hot effluent gas stream leaving the reaction zone principally comprises CO and $H_2$. A small amount of $H_2O$, $CO_2$, $CH_4$, and $H_2S$, may be present in the product gas along with a regulated amount of entrained particulate carbon (about 0.01 to 10 percent by weight of the carbon in the fuel).

The hot gaseous effluent stream from the gas generator requires substantially no further processing (except for possible cooling) and may be fed directly into a separate ore reduction zone that is integrated with the gas generator. The extraordinary capability of the effluent gas stream for reducing metallic oxides to lower oxides or to elemental metal is indicated by its unusually high reducing ratio of at least 15. Furthermore, additional reducing capacity found in the effluent gas stream which is not indicated by the reducing ratio is derived from the regulated amounts of entrained particulate carbon.

The previously mentioned moderator for controlling the temperature in the reaction zone may be either a portion of cooled reducing gas from the reaction zone, a portion of the cooled and cleaned off-gas from an integrated ore reduction zone to which at least a portion of said reducing gas is supplied, or a mixture of both of said cooled gases. These temperature moderators comprise respectively the combustion products of a hydrocarbonaceous fuel, carbonaceous fuel, or mixtures of both. The minimum reducing ratio of the first moderator is 15 and the second is about 1. By proper balance of the liquid hydrocarbon fuel, oxidizing gas, and moderator, the desired temperature control within the reaction zone of the gas generator is obtained. Minimizing or even eliminating the preheating of materials fed into the reaction zone is advantageous.

In addition to applications in metallurgy, the gas mixture as produced by the process of this invention may be used directly as feedstock in processes for the synthesis of phosgene, methanol, hydrocarbons, oxygenated organic chemicals, or in the manufacture of hydrogen. Some of these processes are operated at high pressure and an economic advantage of our process is that our reducing gas may be generated at any required pressure from atmospheric to 3,500 p.s.i.g. Costly secondary compression operations are thereby avoided.

The process of this invention will be described particularly in connection with an iron ore blast furnace whose operation is integrated with the generation of the aforementioned improved reducing gas. When a portion of the reducing gas of this invention is introduced into an iron ore blast furnace its high reducing power permits a substantial portion of expensive metallurgical coke to be eliminated from the blast furnace burden. For each pound of oil fed to the reducing gas generator, about 1.2 pounds of coke may be eliminated from the blast furnace burden. This provides space in the blast furnace for a greater charge of iron ore and associated materials. Production of metallic iron is increased by injecting into the blast furnace our externally generated reducing gas.

Off-gas from the top of a blast furnace is usually burned to recover heat. By our invention a portion of the cleaned and cooled, off-gas is introduced into the reaction zone of the external reducing gas generator to moderate the reaction temperature therein while a portion of the product-reducing gas from the generator is introduced into the blast furnace to reduce iron oxide to elemental iron.

It is therefore a principal object of the present invention to provide a method for producing large quantities of a reducing gas mixture comprising essentially $H_2+CO$ and having a minimum reducing ratio of 15.

Another object of this invention is to provide an improved process for producing a high-quality reducing gas having a mole ratio $CO/H_2$ of about 0.5 to 2 by the partial oxidation of a liquid hydrocarbonaceous fuel, substantially in the absence of supplemental $H_2O$ for use in applications such as reducing metal oxides, chemical synthesis, and as a fuel gas.

A further object of this invention is to reduce iron oxide to metallic iron with greater efficiency and economy by integrating the operation of an iron ore blast furnace with the production of reducing gas in a separate gas generator.

DESCRIPTION OF THE INVENTION

Suitable liquid hydrocarbonaceous feedstocks include light distillates, naphthas, heavy residuals, crudes, and heavy fuel oils and may be designed by the formula $C_mH_nS_r$ (ignoring any $O_2$ or $N_2$). Equation (I) below expresses the stoichiometric result when all of the carbon in the feed is converted to carbon monoxide and all hydrogen is released as molecular hydrogen, except for a small amount of hydrogen that is lost as hydrogen sulfide.

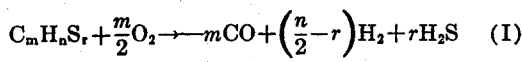

$$C_mH_nS_r + \frac{m}{2}O_2 \rightarrow mCO + \left(\frac{n}{2}-r\right)H_2 + rH_2S \quad (I)$$

In actual operation, a small but regulated amount of the feedstock may be cracked to form methane and free carbon (or soot) as represented by equation (II).

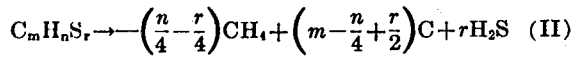

$$C_mH_nS_r \rightarrow \left(\frac{n}{4}-\frac{r}{4}\right)CH_4 + \left(m-\frac{n}{4}+\frac{r}{2}\right)C + rH_2S \quad (II)$$

Undesired products which may be produced but which are minimized in the process of this invention include $CO_2$, $H_2O$, $CH_4$, $H_2S$ and COS. However, the quantity of $CH_4$, $H_2S$ and COS produced is small, the $CH_4$ in more or less fixed amounts at low pressure and the sulfur compounds in essentially quantitative amounts.

The yield of soot, or unconsumed carbon is regulated at 0.01 to 10 percent by weight of the carbon fed as unreacted hydrocarbon on a once-through basis by control of combustion temperature, pressure, residence time, and oxygen supplied. The carbon particles appear (electron micrographically) to be spherical, spongelike, and about 70 microns in diameter. They comprise by analysis essentially 93 percent carbon, 0.8 percent hydrogen, and 4 percent ash. The particulate carbon acts as a reducing agent by reacting with carbon dioxide to produce additional carbon monoxide or with water to produce additional hydrogen which reduce metallic oxides.

The preferred oxidizing gas for the reaction shown by equation (I) is greater than 95 mole percent oxygen. Under carefully controlled conditions, oxygen-enriched air (45% $C_2$ or more) may be used.

"Free O/C" ratio in the operation of the reducing gas generator refers to the atomic ratio of elemental oxygen in the oxidizing stream to the carbon in the hydrocarbonaceous fuel. Likewise, the "total O/C ratio" refers to the atomic ratio of elemental and combined oxygen in the feed streams to all of the carbon in the hydrocarbonaceous fuel.

The efficiency of the partial oxidation process for converting hydrocarbonaceous fuels to net hydrogen and carbon monoxide i.e., effluent $H_2+CO$ minus $H_2+CO$ in the moderator, may be expressed by the terms "net specific oxygen consumption" and "net cold gas efficiency." The net specific oxygen consumption is defined as the moles of oxygen required per thousand moles of net hydrogen + carbon monoxide generated. The net cold gas efficiency is defined as the ratio of the gross heating value of the net $H_2+CO$ produced to the gross heating value of the hydrocarbonaceous fuel. While it is desirable to minimize the oxygen consumption and maximize the cold gas efficiency, the two do not necessarily go hand in hand. Cold gas efficiency must pass through a maximum at some oxygen/carbon ratio because excessive oxygen burns part of the product carbon monoxide and hydrogen to undesired carbon dioxide and water. Net cold gas efficiency reaches a maximum at a free O/C ratio of about one; whereas, the net specific oxygen consumption reaches a minimum at a lower free O/C ratio than that corresponding to the maximum net cold gas efficiency.

The product gas leaving the reaction zone when operating with oxygen having a purity of 95 percent or more contains about 80 mole percent of carbon monoxide plus hydrogen and has a mole ratio $Co/H_2$ of about 0.5 to 2. The product gas has a minimum reducing ratio of 15, a maximum $CO_2$ content of 1.7 mole percent, and a maximum $H_2O$ content of 5 percent. The gas also contains particulate carbon in the amount of 0.01 to 10 percent by weight of the carbon in the hydrocarbon fuel.

The effluent stream of hot reducing gas from the generator may be used directly in some applications, or it may be all or partially cooled. For example, the hot reducing gas from the generator may be divided into two streams, called for discussion, first and second streams. The first stream of reducing gas is cooled from the reaction temperature of about 3,000° F. to a predetermined temperature, (for example, 120° F.) by well-known means, such as by a waste-heat boiler or by direct quenching in cold water. Quenching in water may also serve to control the amount of particulate carbon in the reducing gas. A portion of the cooled first stream of reducing gas is then recycled to the reaction zone of the generator to moderate the temperature therein. The gas moderator may be separately introduced into the reaction zone; or the liquid hydrocarbon feed may be atomized by the gas moderator and injected into the reaction zone.

The quantity of cooled recycled reducing gas required to moderate the temperature in the generator may be estimated by equation (III).

$$V_r = (T_3-T_2) V_o/(T_2-T_1) \quad (III)$$

where:
$V_r$ is the volume of cooled product reducing gas at a temperature $T_1$ recycled to the generator to moderate the temperature in the reaction zone;

$V_o$ is the total volume of effluent gas from the generator produced without any moderator at a temperature $T_3$, as determined by a method described by DuBois Eastman, Paper 13—Section IV of the Fifth World Petroleum Congress 1959, and other similar articles available in the literature; and $T_2$ is the desired temperature in the reaction zone of the generator.

The remainder of the cooled first stream of reducing gas may be used to cool the hot second stream of reducing gas from the generator to a temperature below the temperature in the reaction zone.

In another embodiment of this invention the economics and productivity of an iron ore blast furnace are substantially improved by augmenting the carbon monoxide reducing gas normally produced in a blast furnace with supplemental injections of our externally generated reducing gas mixture having a minimum reducing ratio of 15 and a mole ratio $CO/H_2$ of about 0.5 to 2 along with a controlled minor amount of entrained particulate carbon. Off-gas from the blast furnace is cleaned, cooled, and a portion of it is introduced into the reducing gas generator to moderate the reaction temperature therein. Another portion of the cooled off-gas may be used to cool the hot reducing gas leaving the gas generator.

The smelting of iron ore in the blast furnace is essentially a process of removing the oxygen from the iron oxides through the use of a reducing agent. Iron ore charged into the blast furnace is usually in the form of hematite ($Fe_2O_3$) or magnetite ($Fe_3O_4$), although there may be present small proportions of limonite ($2Fe_2O_3 \cdot 3H_2O$) or siderite ($FeCO_3$). Metallurgical coke charged into the blast furnace is the heterogeneous cellular residue from the destructive distillation of bituminous coal and comprises about 85–89 percent fixed carbon. Coke has two important functions in the blast furnace: first, as a source of heat for purposes such as for the metallurgical reducing reactions that take place, for melting the iron and other metals, and for slagging and fluxing the gangue of the ore, the limestone, and the ash of the coke; and second, as a source of carbon to supply the reducing agent for the process of reducing or removing the oxygen from the iron oxide in the ore.

In the operation of a conventional vertical blast furnace, iron ore, coke and limestone are charged into the top of the furnace according to a predetermined filling cycle, and molten iron and slag are drawn off at the bottom of the furnace. Slowly moving down the shaft of the furnace, the charge is contacted by a rapid upward flow of hot gases. These ascending gases originate in the bosh section of the furnace and are the reaction products of coke in the charge and blasts of hot air injected into the furnace through the tuyeres which circle the furnace near the top of the hearth.

At the tuyeres, the bosh gas is at a temperature of about 2,400° F. and comprises in percent by volume CO–32, $H_2$–1.5, and $N_2$–66.5. At full blast, the gas travels through the full height of the furnace in about 3 seconds, emerging from the top of the furnace, as "off-gas" at a temperature of about 400° F. and comprising in percent by volume CO–24.7, $CO_2$–14.6, $H_2$–4.1 and $N_2$–56.6.

Thus, the charge, with its interstitial spaces filled with an ascending atmosphere containing a surplus of the reducing gas CO descends to regions of higher and higher temperatures. At different levels of the blast furnace, then, chemical reactions peculiar to the temperatures at these levels occur. For example, in the upper part of the stack at moderately high temperatures ranging from about 482° to 1,292° F., the indirect reduction of $Fe_2O_3$ by CO may take place in three exothermic steps, the $Fe_2O_3$ being successively reduced to $Fe_3O_4$, FeO, and finally to Fe, thusly:

$$Fe_2O_3 az 3CO = 2Fe + 3CO_2 - 7,800 \text{ B.t.u.} \quad (IV)$$

Free carbon particles that penetrate the porous ore also act as a reducing agent for the oxides of iron at temperatures of about 942° to 1,292° F., thusly:

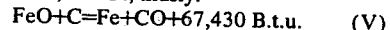
$$FeO + C = Fe + CO + 67,430 \text{ B.t.u.} \quad (V)$$

Although the reduction of ore by carbon absorbs much heat, the carbon monoxide produced can be utilized in the reduction of more iron oxide and thus liberate heat, minimizing the net heat absorbing effect. At the bottom of the stack where temperatures are above 2,300° F., carbon will reduce manganese, silicon, and phosphorous oxides.

By the process of our invention, the operation of a blast furnace may be integrated with the generation of an improved reducing gas. The temperature at which the externally generated reducing gas is supplied to the blast furnace is established by the temperature inside the blast furnace at the desired injection level plus an allowance for heat loss in the lines. For example, this stream of reducing gas may be introduced into the blast furnace at a temperature between 2,200° and 2,500° F. somewhere above the tuyeres and below the mantle to augment the reducing gas generated in the bosh zone of the blast furnace. If the blast furnace is operated at a pressure of about 2 atmospheres, then the external reducing gas generator should be operated at a slightly higher pressure to provide for the pressure drop in the lines.

About 1 percent of the off-gas from the blast furnace having a minimum reducing ratio of about 1 is cooled, cleaned, compressed, and introduced into the reaction zone of the gas generator to moderate the reaction temperature. Another use for the moderating gas, if so desired, is to atomize the liquid hydrocarbon feed which is then injected into the reaction zone of the generator. The quantity of cooled, cleaned blast furnace off-gas required to moderate the temperature in the generator may be estimated by equation (VI).

$$V_b = (T_3 - T_2) V_g / (T_2 - T_4) \quad (VI)$$

where:

$V_b$ is the volume of cooled cleaned blast furnace off-gas at a temperature $T_4$ introduced into the generator to moderate the temperature in the reaction zone;

the terms $V_g$, $T_2$, and $T_3$ were previously described in connection with equation (III).

Instead of cooled blast furnace gas as the gas moderator in this embodiment of the invention, a portion of cooled reducing gas in the amount as determined by equation (III) may be used.

Alternately, a portion of the cooled, cleaned off-gas the blast furnace may be mixed with a portion of the cooled reducing gas from the generator and the combined streams used as a temperature moderator. The quantity of each of these gases in the mixture required to moderate the temperature in the reaction zone may be determined by equation (VII).

$$V_b' = (T_3 - T_2) V_g / (T_2 - T_4) - (T_2 - T_1) V_r' / (T_2 - T_4) \quad (VII)$$

where:

$V_r'$ and $v_b'$ are fractions respectively of $V_r$ (when $V_b$ is 0) and $V_b$ (when $V_r$ is 0), as determined and defined by equations (III) and (VI).

The spent reducing gas or off-gas leaves from the top of the blast furnace at a temperature of about 300° to 600° F., containing about 4 to 20 grains of dust and about 7 to 50 grains of water vapor per standard cubic foot. This off-gas is cleaned, cooled and dried to avoid fouling up the gas mains, heat exchange surfaces and to improve combustion characteristics. Dust is eliminated from the gas by first reducing the velocity of the gas flow in a settling chamber and then wet washing the gas in a tower-type washer followed by precipitation. This treatment reduces the dust content to less than 0.02 grains per cubic foot, and the temperature to about 70° to 200° F. If required for specific applications, the $CO_2$ and $H_2O$ levels may be reduced further by standard procedures.

Thus the cooled off-gas from the blast furnace which is usually burned in a "stove" to preheat the blast may now be sent to an external gas generator for use as a temperature moderator. There the off-gas is regenerated, upgraded and then returned to the blast furnace where as a reductant it is of greater economic value than as a fuel.

DESCRIPTION OF THE PREFERRED EMBODIMENTS

By the process of this invention an improved reducing gas is produced which has particular application for the reduction of metal oxides, including iron, copper, vanadium, nickel, chromium, manganese, and titanium. The process of the invention will be further illustrated but is not to be limited by examples 2 and 3 as summarized by the information shown in table I. Reducing ratios for the gasses in examples 2 and 3 are much higher in comparison with the reducing ratio for the product gas in example 1 which represents typical conventional practice.

In examples 1 to 3, heavy fuel oil having an API gravity of 19 and a gross heating value of 18,772 B.t.u. per pound is reacted with 99.6 mole percent oxygen in an unpacked non-catalytic synthesis gas generator. The ultimate analysis of the process oil in weight percent is C–87.23, $H_2$–11.20, and S–1.57.

Example 1 represents current practice for the generation of synthesis gas with steam being used to moderate the temperature in the reaction zone. Product gas leaving the reaction zone at a temperature of 2,720° F. has a mole ratio $CO/H_2$ of 1.12 and a reducing ratio of 6.2.

In example 2, with a portion of the product reducing gas being recycled to the reaction zone to moderate the temperature therein a high-quality reducing gas is produced having a $CO/H_2$ mole ratio of 1.37. This gas has a reducing ratio of 22.5, which is an increase of 268 percent over the reducing ratio of the gas described in example 1. No supplemental steam is introduced into the generator; and consequently the reducing gas contains less $H_2O$ and $CO_2$.

No preheaters are required for the process of example 2, the moderator assumed being fed to the reaction zone at compressor discharge temperature. Consequently, even though the net cold gas efficiency of example 2 is less than example 1, the total oil requirement (process oil plus preheat fuel) is less. The particulate carbon is less because part of the carbon associated with the reducing gas intended for use as the moderator is removed in the quench water.

The higher reducing ratio in example 2 requires a lower total O/C ratio. Soot is a function of the total O/C ratio and combustion temperature. For an assumed limiting temperature of 2,970° F., the total O/C ratio must be at least equal to 1.054. Since there is no independent control of total O/C ratio, as by the addition of steam in example 1, in example 2 the desired total O/C ratio must be obtained by operating at the free O/C ratio of 1.054. This higher free O/C ratio unavoidably results in higher net specific oxygen consumption. However, the significantly improved reducing ratio results in a sufficiently greater ultimate utilization of the $H_2+CO$ so that the specific oxygen consumption basis $H_2+CO$, ultimately utilized is decreased.

In example 3, a process is demonstrated which integrates the generation of an improved reducing gas in a separate gas generator with the reduction of iron ore in a blast furnace. The reducing gas has a $CO/H_2$ mole ratio of 1.47. Furthermore, this gas has a reducing ratio of 16, which is an increase of 158 percent over the reducing ratio of the gas described in example 1. For each pound of oil fed to the gas generator, about 0.39 pounds of off-gas from an iron ore blast furnace are cleaned, cooled to a temperature of about 200° F. and introduced into the generator to moderate the temperature of the reaction zone. The reducing gas leaves the generator at a temperature of about 2,910° F. and is cooled to about 2,200° to 2,500° F. It is then injected into a blast furnace where CO and $H_2$ in the reducing gas convert the iron oxide to metallic iron. Additional reducing power is provided by the particulate carbon entrained in the reducing gas.

Example 3 is intermediate between examples 1 and 2. The off-gas from the blast furnace which contains a total O/C ratio of 1.6 tends to increase the total O/C ratio of the reaction gases. Thus a total O/C ratio of 1.079, higher than for example 2 can be obtained with a free O/C ratio of 1.040 when feeding the amount of blast furnace off-gas specified in example 3. At this total O/C ratio, control of carbon requires a temperature of 2,910° F., which is lower than the temperature required for example 2. This somewhat higher total O/C ratio makes the reducing ratio less than example 2 but the lower free O/C ratio results in a lower net specific oxygen consumption and a higher net cold gas efficiency.

The process of the invention has been described generally and by examples with reference to liquid hydrocarbon feedstocks and reducing gas of particular compositions for purposes of clarity and illustration only. It will be apparent to those skilled in the art from the foregoing that the various modifications of the process and the materials disclosed herein can be made without departure from the spirit of the invention.

We claim:

1. A process for the production of reducing gas having a minimum mole ratio $(H_2+CO)/(H_2O+CO_2)$ of 15 which comprises a. introducing into the reaction zone of an unpacked noncatalytic synthesis gas generator a charge comprising a hydrocarbonaceous liquid, a temperature-moderating gas mixture having a mole ratio $(H_2+CO)/(H_2O+CO_2)$ greater than about 1 and selected from the group consisting of a recycled cooled portion of effluent reducing gas from said reaction zone, ore reduction off-gas cooled and compressed to a pressure above that of said reaction zone, and mixtures thereof, and an oxidant selected from the group consisting of at least 95 percent oxygen and oxygen-enriched air containing at least 45 percent oxygen by volume, wherein the ratio of oxygen atoms in the oxidant to carbon atoms in the liquid hydrocarbonaceous feed is in the range of about 1.0 to 1.2, and said temperature-moderating gas mixture is supplied to the reaction zone at a temperature below 2,000° F. and in an amount to permit a reaction temperature above about 2,000° F.; and b. reacting said charge by partial oxidation in said reaction zone in the absence of water other than the water supplied in step (a) at a temperature above about 2,000° F. and at a pressure in the range of atmospheric to 3,500 p.s.i. to generate said effluent-reducing gas comprising hydrogen, carbon monoxide, carbon dioxide, water, and particulate carbon in the amount of about 0.01 to 10 percent by weight of carbon in the liquid hydrocarbon, and less than 7 mole percent of $CO_2+H_2O$.

2. The process of claim 1 wherein said temperature-moderating gas mixture is said recycled cooled portion of effluent reducing gas in the amount specified in the following equation:

$$V_r = (T_3-T_2)\,V_g/(T_2-T_1)$$

where:

$V_r$ is the volume of cooled effluent reducing gas at a temperature $T_1$ that is recycled to the generator to moderate the temperature in the reaction zone; $V_g$ is the total volume of effluent gas from the generator produced without any moderator at a temperature $T_3$; and $T_2$ is the desired temperature in the reaction zone of the generator.

3. The process of claim 1 wherein said temperature-moderating gas mixture is cooled, cleaned, and compressed off-gas from an iron ore blast furnace in the amount specified in the following equation:

$$V_b = (T_3-T_2)\,V_g/(T_2-T_4)$$

where:

$V_b$ is the volume of cooled, cleaned, and compressed off-gas from an iron ore blast furnace at a temperature $T_4$ that is introduced into the generator to moderate the temperature in the reaction zone;

$V_g$ is the total volume of effluent gas from the generator produced without any moderator at a temperature $T_3$; and $T_2$ is the desired temperature in the reaction zone of the generator.

4. The process of claim 1 wherein said temperature-moderating gas mixture is a recycled cooled portion of effluent-reducing gas from said reaction zone in admixture with a portion of washed, dried, cooled to a temperature below 300° F., and compressed to a pressure above that of said reaction zone off-gas from an ore reduction zone, and wherein for a given volume of recycled effluent reducing gas ($V_r'$) at a TABLE I.—REDUCING GAS GENERATION
[Typical operating data]

| Example | 1 | 2 | 3 |
|---|---|---|---|
| Charge to generator: | | | |
| Process oil, lbs | 1.00 | 1.00 | 1.00 |
| Moderator, lbs | 0.35 | 0.30 | 0.39 |
| Source | Steam | Red. gas | Bl. furn. |
| Composition: | | | |
| Carbon monoxide, mole percent | | 55.01 | 20.87 |
| Hydrogen, mole percent | | 40.03 | 4.59 |
| Carbon dioxide, mole percent | | 1.09 | 19.82 |
| Water, mole percent | 100 | 3.24 | 5.02 |
| Nitrogen, mole percent | | (¹) | 49.70 |
| Balance, mole percent | | 0.63 | |
| 100% oxygen, s.c.f. | 13.5 | 14.52 | 14.33 |
| Oxygen stream purity, volume percent | 99.6 | 99.6 | 99.6 |
| Operating conditions, temperature °F.: | | | |
| Process oil | 500 | 60 | 60 |
| Moderator | 500 | 200 | 200 |
| Oxygen (99.6 mole percent) | 100 | 100 | 100 |
| Effluent gas | 2,720 | 2,970 | 2,910 |
| Free O/C, atom ratio | 0.980 | 1.054 | 1.040 |
| Total O/C, atom ratio | 1.255 | 1.054 | 1.079 |
| Product, gas composition, mole percent: | | | |
| Carbon monoxide | 45.26 | 55.01 | 53.15 |
| Hydrogen | 40.44 | 40.03 | 36.05 |
| Carbon dioxide | 3.38 | 1.09 | 1.51 |
| Water | 10.38 | 3.24 | 4.05 |
| Methane | 0.10 | 0.12 | 0.10 |
| Argon | 0.10 | 0.12 | 0.11 |
| Nitrogen | (¹) | (¹) | 4.67 |
| Hydrogen sulfide | 0.34 | 0.39 | 0.36 |
| Carbonyl sulfide | (¹) | (¹) | (¹) |
| | 100.00 | 100.00 | 100.00 |
| Total gas generated, s.c.f. | 55.41 | ² 48.04 | 53.03 |
| Particulate carbon, lbs | 0.017 | ² 0.015 | 0.017 |
| Performance data: | | | |
| Net specific oxygen consumption, s.c.f. free O/M s.c.f. ($H_2+CO$) | 284 | 318 | 303 |
| Net cold gas efficiency, B.t.u. ($H_2+CO$)/B.t.u. oil | 81.9 | 78.7 | 81.5 |
| Reducing ratio $(H_2+CO)/(H_2O+CO_2)$ | 6.2 | 22.8 | 16.0 |

¹ Trace.
² Net quantities after diverting a portion of the product reducing gas for use as a moderator.

temperature $T_1$ present in said temperature moderating gas mixture, the volume of ore-reduction off-gas ($V_b'$) at a temperature $T_4$ is determined by the following equation:

$$V_b' = (T_3-T_2) V_o/(T_2-T_4) - (T_2-T_1) V_r'/(T_2-T_4)$$

where:
$V_o$ is the total volume of effluent gas from the generator produced without any moderator at temperature $T_3$; and
$T_2$ is the desired temperature in the reaction zone of the generator.

5. The process of claim 1 with the additional steps of dividing the hot effluent-reducing gas from the reaction zone into a first stream and a second stream, cooling said first stream to a temperature below 2,000° F., recycling a portion of said cooled first stream to said reaction zone as at least a portion of said temperature-moderating gas mixture, and mixing the remainder of said cooled first stream with all of said second stream of reducing gas to cool said second stream to a predetermined temperature.

6. The process of claim 1 in which substantially all $H_2O$ and $CO_2$ are removed from said temperature-moderating gas before it is introduced into the generator reaction zone to moderate the temperature therein.

* * * * *